(12) United States Patent
Reddicliffe

(10) Patent No.: US 8,266,854 B2
(45) Date of Patent: Sep. 18, 2012

(54) GROMMET CLOSURE DEVICE

(75) Inventor: Edward Reddicliffe, New Milton (GB)

(73) Assignee: Cannon Technologies Limited, New Milton, New Hampshire (GB)

( * ) Notice: Subject to any disclaimer, the term of this patent is extended or adjusted under 35 U.S.C. 154(b) by 0 days.

(21) Appl. No.: 13/005,624

(22) Filed: Jan. 13, 2011

(65) Prior Publication Data

US 2011/0179742 A1 Jul. 28, 2011

Related U.S. Application Data

(63) Continuation-in-part of application No. 12/761,623, filed on Apr. 16, 2010, now abandoned.

(30) Foreign Application Priority Data

Jan. 15, 2010 (GB) .................................. 1000658.3

(51) Int. Cl.
*E04C 2/52* (2006.01)
*E04H 14/00* (2006.01)

(52) U.S. Cl. ................................ 52/220.8; 52/27; 52/73
(58) Field of Classification Search .............. 52/27, 198, 52/204.1, 73, 192, 503, 220.8
See application file for complete search history.

(56) References Cited

U.S. PATENT DOCUMENTS

| 4,551,577 A | 11/1985 | Byrne |
| 6,632,999 B2* | 10/2003 | Sempliner et al. ............. 174/659 |
| 7,141,744 B2* | 11/2006 | Cloutier ........................ 174/650 |
| 7,507,912 B1* | 3/2009 | Sempliner et al. ......... 174/153 G |
| 7,871,079 B2* | 1/2011 | Dukes et al. ................... 277/616 |
| 2008/0290611 A1* | 11/2008 | Dukes et al. ................... 277/637 |

FOREIGN PATENT DOCUMENTS

| BE | 906.164 | 4/1997 |
| DE | 10 2004 058 347 | 6/2006 |
| EP | 0 684 674 | 11/1995 |
| EP | 1 209 786 | 5/2002 |
| EP | 2 065 992 | 6/2009 |
| WO | 03/023922 | 3/2003 |
| WO | 2009/046068 | 4/2009 |

OTHER PUBLICATIONS

Search Report dated Apr. 30, 2010 in corresponding GB application No. 1000658.3.
International Search Report dated Jul. 6, 2011 in corresponding Application No. PCT/GB2011/050039.

* cited by examiner

*Primary Examiner* — Mark Wendell
(74) *Attorney, Agent, or Firm* — Faegre Baker Daniels LLP

(57) ABSTRACT

A grommet closure device for sealing a cable opening in a raised floor, the device comprising: a frame structure defining an aperture; and a sealing member having flexible sealing means attached along its length in cantilever fashion, the sealing member being arranged to span the aperture such that unattached ends of the sealing means can extend away from the sealing member and rest on the frame structure, thereby covering the aperture.

15 Claims, 11 Drawing Sheets

EXPLODED VIEW

END VIEW

SIDE VIEW

GROMMET CLOSURE DEVICE

CROSS-REFERENCE TO RELATED APPLICATION

This application is a continuation-in-part of co-pending U.S. patent application Ser. No. 12/761,623 entitled A FLOOR GLAND, filed Apr. 16, 2010, the entire disclosure of which is expressly incorporated by reference herein.

BACKGROUND

The present invention relates to a grommet closure device for sealing cable openings through a raised access floor installation, typically used in a data centre, or similar.

Raised access floors, typically comprising a plurality of floor tiles, are often used in buildings and offices. In particular, raised floors are often used for supporting computer equipment in a data centre, or similar, housing a large number of computer servers and related equipment arranged in cabinets or racks. Air-conditioning, or similar heat-exchange, means are often provided underneath the raised access floor structure for cooling the computer equipment through designated cooling vents provided for the cabinets or racks.

In addition, openings are often incorporated into the raised access floors to allow for various types of under floor cabling to be fed into the cabinets or racks for connection to computer equipment housed therein.

In order to maximise cooling of the computer equipment via the designated vents, it is desirable to restrict the flow of air through the openings provided for the cables in the raised access floor to prevent cooling air from leaking out through these holes whereby it will not be directed to the computer equipment that needs it.

WO 03/023922 discloses a floor grommet closure device for preventing cooling air from escaping through a cable opening, the device arranged to fit into an opening in a raised floor and having brushes that extend out from the sides of the grommet frame across the opening to restrict the flow of cooling air through the opening whilst allowing cabling to pass through it between the fibres of the brushes.

A problem with grommet closure devices of this design, however, is that cabling passing through an opening tends to be pulled fairly tight, which causes it to follow the shortest path through the opening and run along the sides of an opening. Due to the brush fibres being secured at the sides of the device, cabling typically passes through the brush fibres near to their roots, which causes the brush fibres to substantially distort and separate along their length, leaving large gaps and pathways through the brushes that cooling air can escape through, thereby considerably reducing the effectiveness of the seal provided by the brushes.

SUMMARY

According to the present invention there is provided a grommet closure device for sealing a cable opening in a raised floor, the device comprising: a frame structure defining an aperture; and a sealing member having flexible sealing means attached along its length in cantilever fashion, the sealing member being arranged to span the aperture such that unattached ends of the sealing means can extend away from the sealing member and rest on the frame, thereby covering the aperture.

The present invention therefore provides an improved grommet closure device, with any cabling that is pulled tight against the side of the frame passing through the unsecured, free, ends of the sealing means (e.g. brush fibres) rather than the secured roots of the sealing means and hence only the tips of the sealing means are deflected rather than the whole length. Beneficially, this arrangement minimises the gaps or openings caused by cabling as it passes through the sealing means thus preventing cooling air from escaping.

Furthermore, the frame structure preferably has a detachable member to allow it to be easily fitted around pre-installed cabling in a cable opening. The sealing member is also, ideally, detachable for similar reasons.

The present invention is, preferably, rectangular with the sealing member being arranged to span across the centre of the aperture between two ends of the frame such that the sealing means extend out from the sealing member across the aperture towards the sides of the frame to seal the cable opening.

The present invention can also be arranged to seal a cable opening through which cabling can only pass along one side by positioning the sealing member along the opposite side of the frame structure such that the sealing means extend towards the side that the cabling is arranged to pass along so that that the cabling will only pass through the tips of the sealing means and therefore will not create any large gaps or pathways through which cooling air can escape.

In any frame orientation, the sealing member should be arranged to span the aperture such that any cabling will pass through the sealing means near to their unsecured tips and as far from the secured root portion of the sealing means as possible.

The sealing means ideally comprise a plurality of thin, flexible elements provided along the length of the sealing member on either side. The sealing means are, preferably, detachable from the sealing member to allow different types of sealing means to be used depending on the application.

Preferably, the sealing member and the frame members can be secured together using tool-less fixings, which are ideally configured to allow the components to be quickly secured together or released.

An inner surface of at least one side member of the frame preferably has a curved portion, in cross-section, for cabling to run along, wherein the radius of the curved portion is, ideally, greater than the critical bend radius limits of the cabling passing through it.

Preferably, at least one side member of the frame comprises a plurality of anchor points for securing cabling to, using cable ties or similar, to ensure that the cabling runs along the sides of the frames towards the tips of the sealing means. Preferably, the at least one side member comprises a substantially U-shaped portion, in cross-section, along which the plurality of anchor points are provided. Preferably, a plurality of anchor points are provided along the curved portion of the at least one side member. The anchor points are, preferably, slots or castellations.

Preferably, a gap is provided along an inner surface of at least one of the side members for receiving free ends of the sealing means, although they can equally rest on the surface of the side members and provide a good sealing effect. Preferably, the gap is created on an inner surface of the at least one side member between the curved portion and U-shaped portion.

Preferably, the aperture can be partitioned by one or more divider plates, or similar, to separate different cabling, such as power cabling and data cabling, passing through the frame.

Preferably, an outer flange is provided around at least part of the frame for supporting the weight of the frame either when it is fitted into a cable opening, or when it is fitted over an irregular shaped cable opening.

The present invention is not limited to use with a raised floor, however, and may also be used as a grommet closure in walls or bulkheads.

BRIEF DESCRIPTION OF THE DRAWINGS

An example of the present invention will now be described with reference to the accompanying drawings, in which:

FIG. 2 shows a detailed view of a side member of the grommet closure of FIG. 1a;

FIG. 3b shows a plan view of the sealing member of FIG. 3a;

DETAILED DESCRIPTION

Figure 1A:
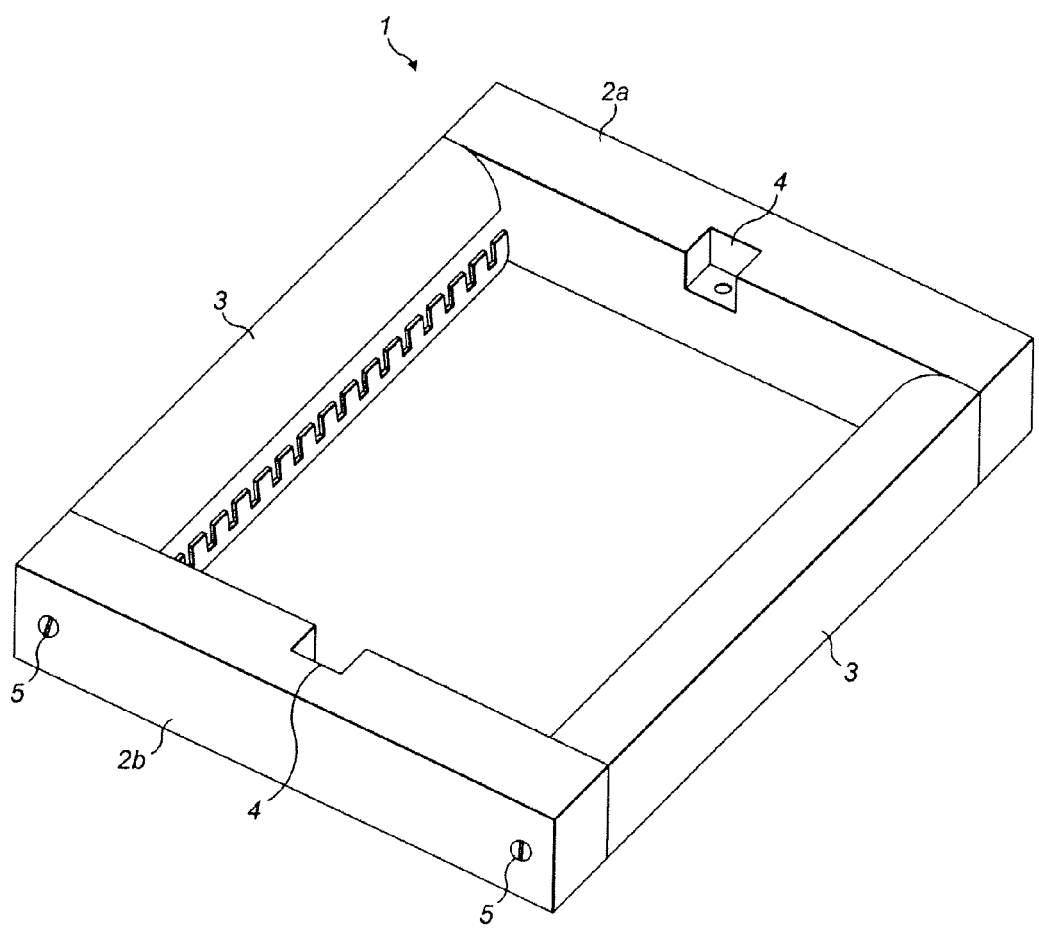
FIG. 1a shows the frame of a grommet closure device according to a first example of the present invention.

FIG. 1a shows a frame structure 1 of a first exemplary grommet closure device having a first end member 2a and a second end member 2b connected by two side members 3 to form a substantially rectangular frame 1. Preferably, screw means 5, or similar, are used to secure the frame 1 together so that at least one of the first or second end members 2a, 2b can be detached to allow the frame 1 to be fitted around pre-existing cabling in a cable opening.

The inner surfaces of the side members 3 have a curved profile in cross-section and comprise both an upper and a lower portion, which are ideally arranged to curve towards each other to form a substantially curved outer shape with a pre-determined radius greater than the critical bend radius limits of the cabling intended to pass through the grommet closure. At least one of the side members 3 is provided with a plurality of slots, or is castellated, to provide anchor points for securing cabling to it using cable ties, or similar.

Figure 1B:
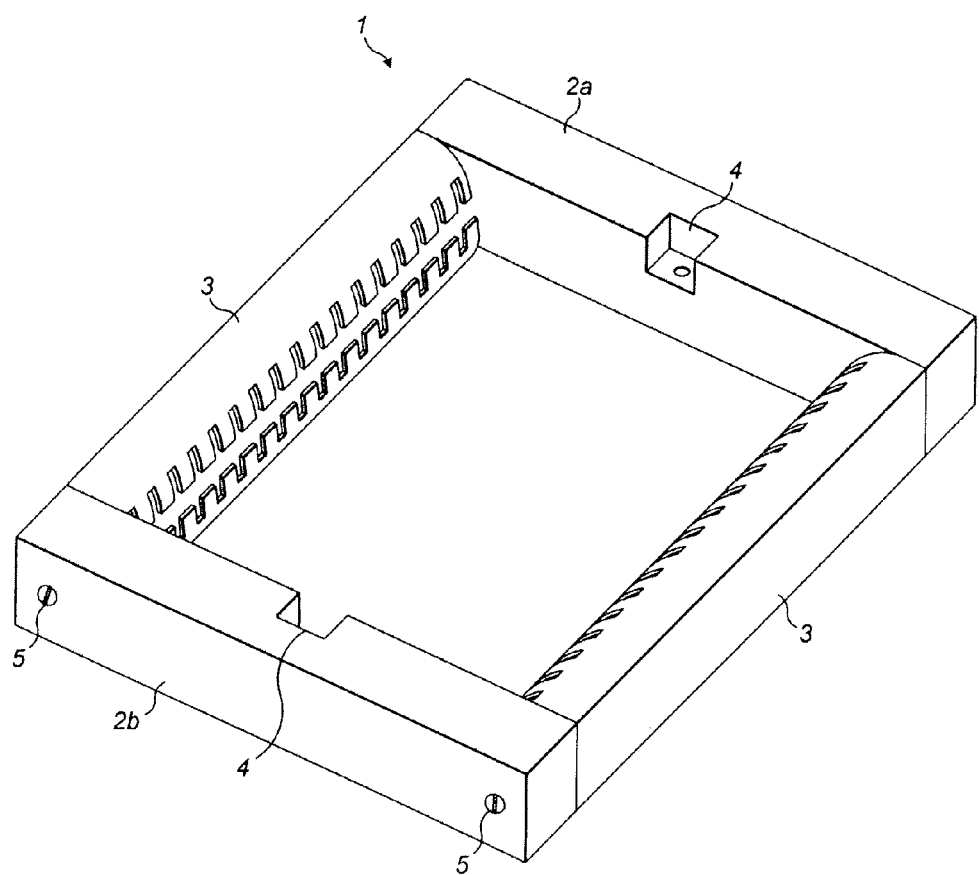
FIG. 1b shows the frame of a grommet closure device according to a second example of the present invention.

FIG. 1b shows a frame structure 1 of a grommet closure device according to a second example of the present invention, which is essentially the same as the first exemplary grommet closure device shown in FIG. 1a, with the addition that anchor points are provided in both the upper and lower portions of at least one of the side members 3. If both the lower and upper portions are provided with anchor points, they ideally have a staggered pitch to avoid any small diameter cabling from slipping into the slots.

In each of the above examples, the first and second end members 2a, 2b of the frame structure 1 are provided with corresponding recesses 4 located at positions distal from the ends, for securing a sealing member 13 between them. Other suitable arrangements for securing the sealing member 13 to the frame structure 1 could, of course, be used.

Figure 2:
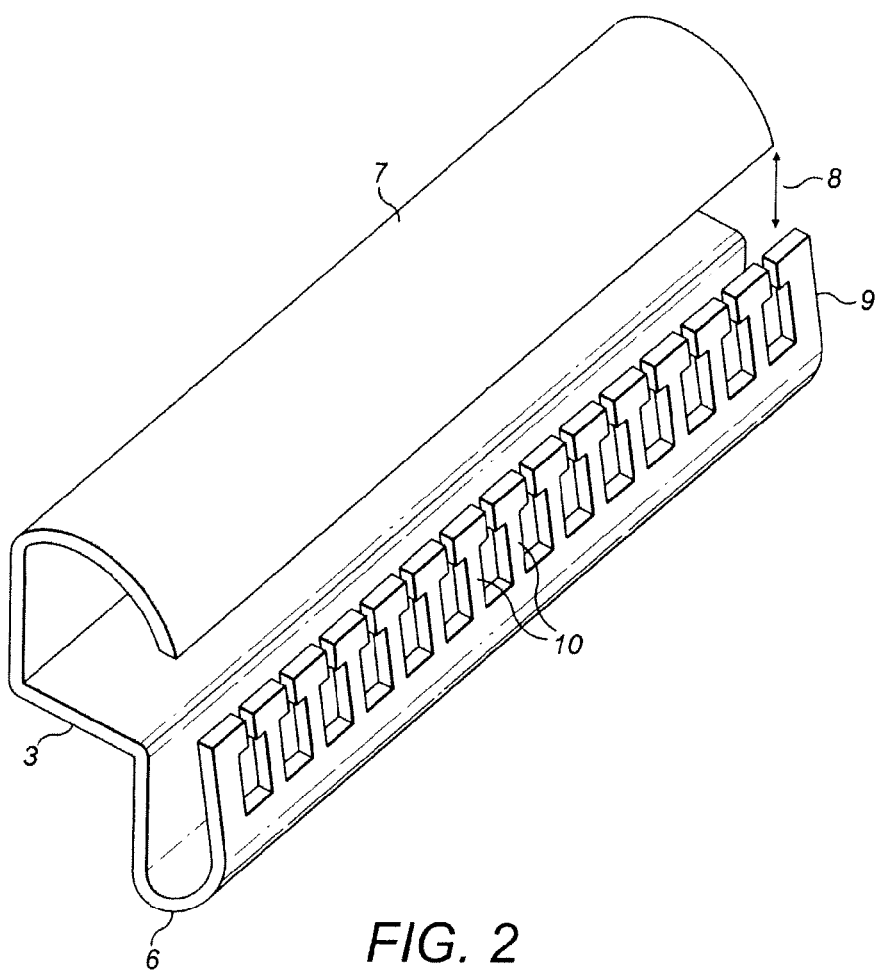

FIG. 2 shows a preferred side member 3 that can be used to form the frame 1 of the exemplary grommet closure shown in FIGS. 1a and 1b. The side member 3 has a shoulder portion 9, which can be used to support the weight of the floor grommet device when fitted into a suitably sized cable opening. It can also be seen more clearly in FIG. 2 how the inner surface of the side member 3 comprises two portions: a curved overhanging upper portion 7 which is arranged to extend perpendicular to the outer edge of the shoulder portion 9 and then curves back reentrantly to provide an inner surface for the side member 3, and a substantially U-shaped (in cross-section) lower portion 6 which is arranged to extend down perpendicularly from the inner edge of the shoulder portion 9. The curved upper portion 7 and curved lower portion 6 both curve inwardly towards each other and in doing so provide a gap 8 which can be used to receive and retain the free ends of sealing means, as will be explained in more detail further on.

The lower portion 6 of the side member 3 shown in FIG. 2 is castellated to provide anchor points 10, as described above. In this preferred example, the lower portion 6 is arranged such that "T"-shaped portions cap each anchor point 10 to prevent any securing means from slipping off the anchor points 10 once secured.

Figure 3A:
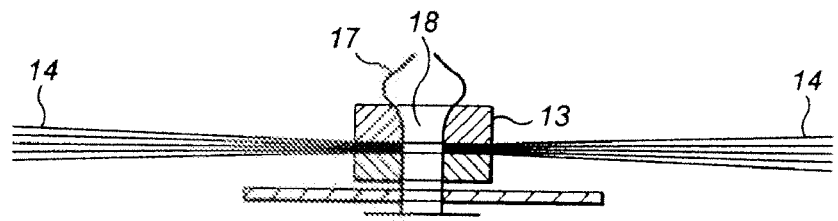
FIG. 3a shows an end view of a sealing member with sealing means attached according to the present invention.
Figure 3B:
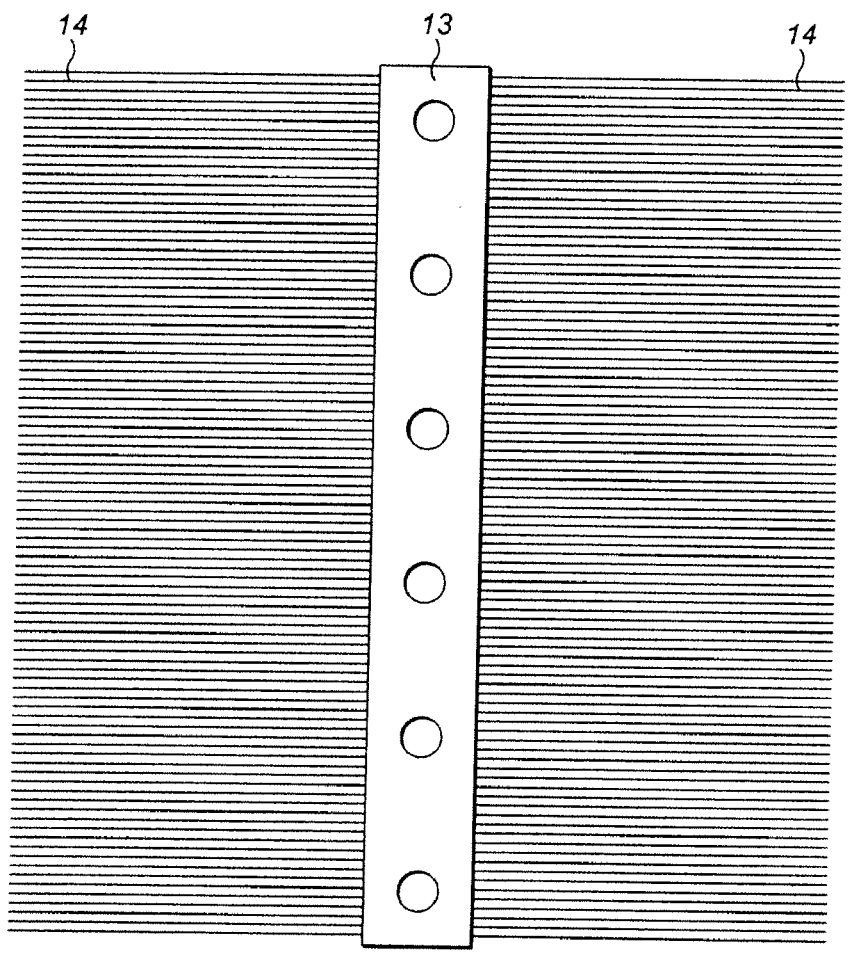

FIGS. 3a and 3b show an exemplary sealing member 13 having sealing means 14, preferably in the form of thin, flexible elements, attached along the sealing member 13 in a cantilever fashion such that first ends of the sealing means 14 are anchored along the length of the sealing member 13 and second ends of the sealing means 14 are free to move.

FIG. 3a shows a cross-sectional end view of an exemplary two-part sealing member 13, wherein the sealing means 14 comprises, for example, two separate brushes, each attached to a spine, as is well known. The spines of each sealing means 14 are then attached on either side and between the two parts of the sealing member 13. The view is taken through one of a plurality of fastening holes 18 that are provided in a spaced arrangement along the length of the sealing member 13, in both parts. In this example, a fastener 17 is arranged to pass through each of the fastening holes 18 and acts to hold the two parts of the sealing member 13 tightly together such that sealing means 14 are securely held between them.

The fasteners 17 are ideally configured to be quickly and easily released without tools, such as the one shown, which will allow the sealing member 13 to be removed from it simply by squeezing the free ends together. Quick-release fasteners such as these are well known. Of course, screw means and/or brackets or similar could alternatively be used to secure the sealing means 14 to the sealing member 13.

Another arrangement might be for two separate sealing means 14 to be attached to a single spine, which is then secured to a sealing member 13 or, alternatively, a sealing member 13 may be provided which acts as a spine wherein the sealing means 14 are directly attached to it. A further option is for the sealing member 13 to be provided with slots along its length on either side for receiving the spines of the sealing means 14.

Although in this example the sealing means 14 are a pair of brushes, a skilled person will appreciate that any arrangement wherein the sealing means 14 comprises a plurality of fibrous elements or similar, such as flexible foam plastic, rubber elements, or extruded plastic, can perform the same function adequately.

FIG. 3b simply shows a plan view of a sealing member 13 with sealing means 14 attached such that they extend in cantilever fashion.

The sealing member 13 is arranged to be attached to the frame structure 1, extending between the end members 2a, 2b such that, when fitted, the sealing means 14 extend away from the sealing member 13 in opposing directions towards the side members 3 of the frame structure 1. The sealing means 14 are configured to extend to the side members 3 such that the free ends can either rest on the surface of the side members, or can be retained within the gap 8 provided between the lower portion 6 and upper portion 7 of each side member 3. In doing so, the sealing means 14 substantially cover the entire area of the frame aperture and hence seal the cable opening.

Although the sealing means 14 are preferably fitted to the sealing member 13 before it is attached to the frame 1, the sealing means 14 could, alternatively, be fitted to the sealing member 13 after it is attached to the frame 1.

Figure 4:
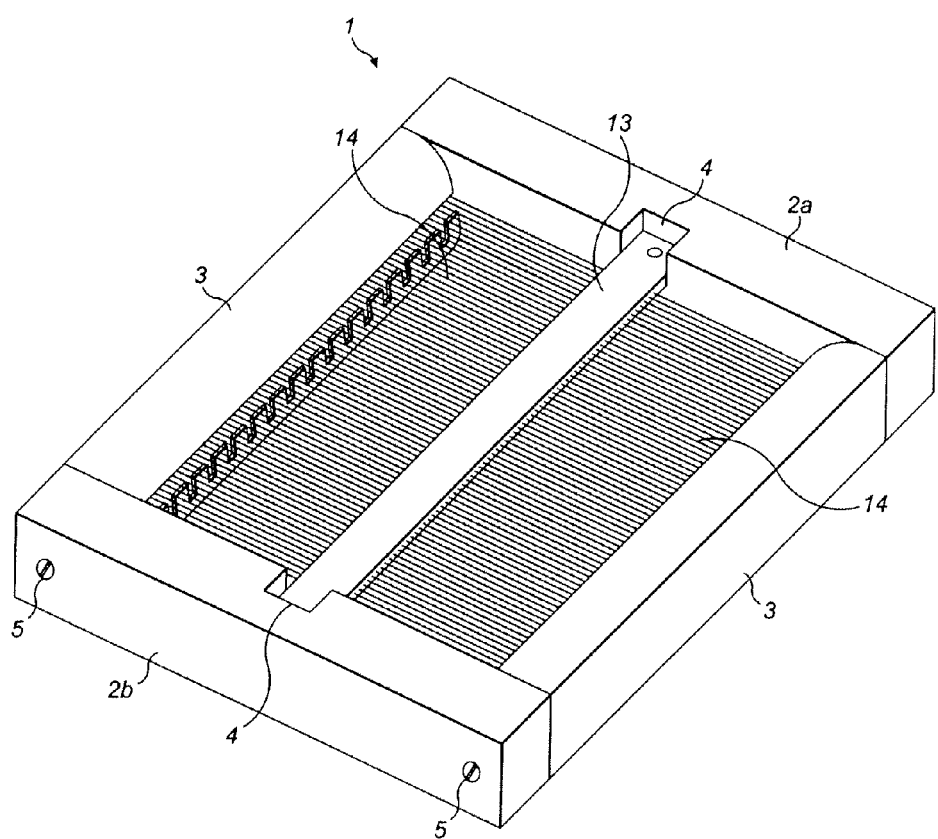
FIG. 4 shows a grommet closure device according to the first example of the present invention.

FIG. 4 shows a grommet closure with all of the components attached, as it might appear when fitted into a cable opening. A sealing member 13, with sealing means 14 attached, extends across the frame structure 1 between two end members 2a, 2b. In this example, the sealing member 13 is secured by screw fixing means into the recesses 4 provided in the end members 2a, 2b, which are positioned such that, when fitted, the sealing member 13 is located a distance away from the side members 3, preferably, but not essentially, at a central position within the aperture defined by the frame structure 1, whereby the sealing member 13 passes across the access hole, effectively partitioning it, and the free ends of the sealing means can rest on the surface of the side members 3, or be retained within the gap 8 provided in them.

Figure 5:
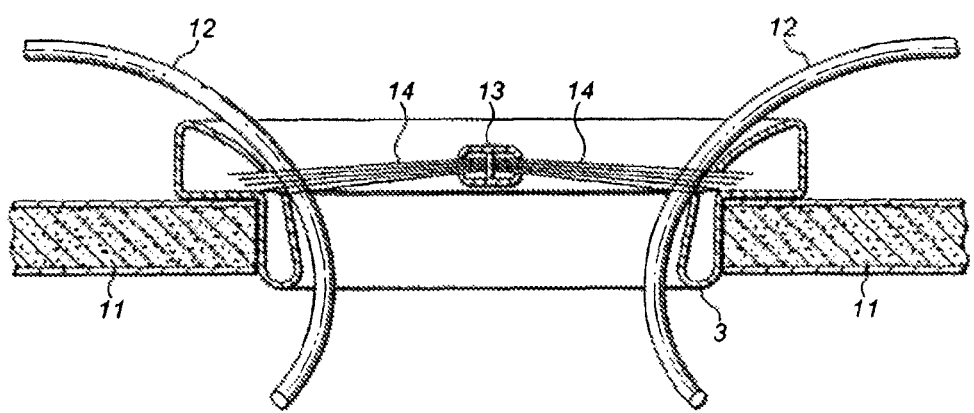
FIG. 5 shows a cross-section of a grommet closure device according to the present invention fitted into a cable opening with cabling passing through it.

FIG. 5 shows a cross-section of the grommet closure fitted into a cable opening provided in a raised floor 11. The shoulder portion 9 on the side members 3 supports the weight of the grommet closure device, with the lower portion 6 of the device ideally being configured to be substantially the same depth as the cable opening. Cabling 12 is shown passing through the device, pulled tight adjacent the side members 3 as will typically be the case. The cabling 12 can then be secured to the anchor points 10 using cable ties, or similar, to ensure that deformation of the sealing means 14 is kept to a minimum.

It can also be seen more clearly in FIG. 5 how the side members 3 are shaped to provide a curved profile for cabling 12 to run along. As mentioned previously, the radius of the curve formed by the lower portion 6 and upper portion 7 is, ideally, configured to be greater than the critical bend radius limits of any cabling that might pass through it, although this will depend on the amount of space available in the cable opening.

Figure 6:
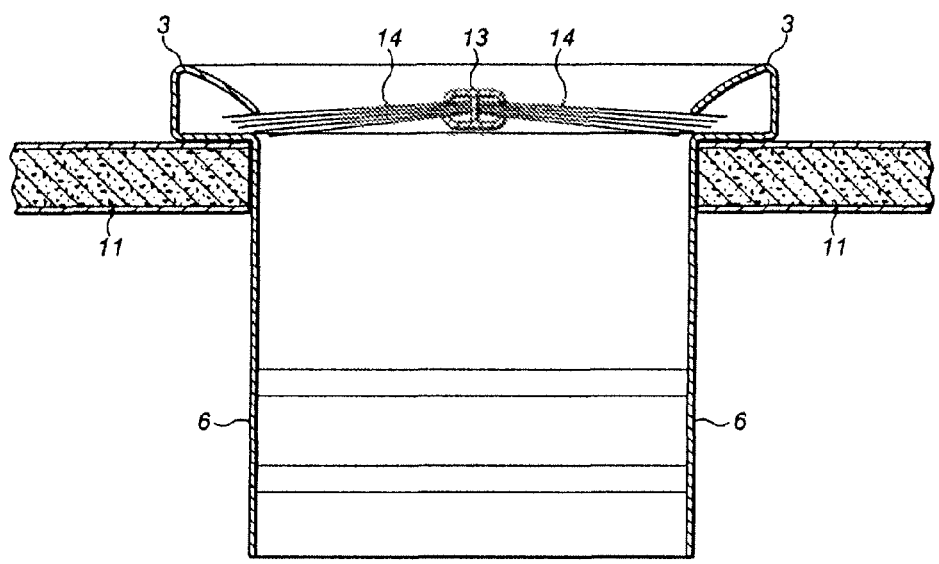
FIG. 6 shows a cross-section of a grommet closure according to a third example of the present invention, wherein the grommet closure is arranged to extend through a cable opening and beneath a raised access floor.

FIG. 6 shows a grommet closure device according to a third example of the present invention fitted in a cable opening in a raised access floor 11. In this example, however, it can be seen that instead of having a substantially U-shaped configuration, the lower portion 6 of the side member 3 is configured to extend down through the cable opening and into the space provided underneath the raised access floor 11.

Figure 7:
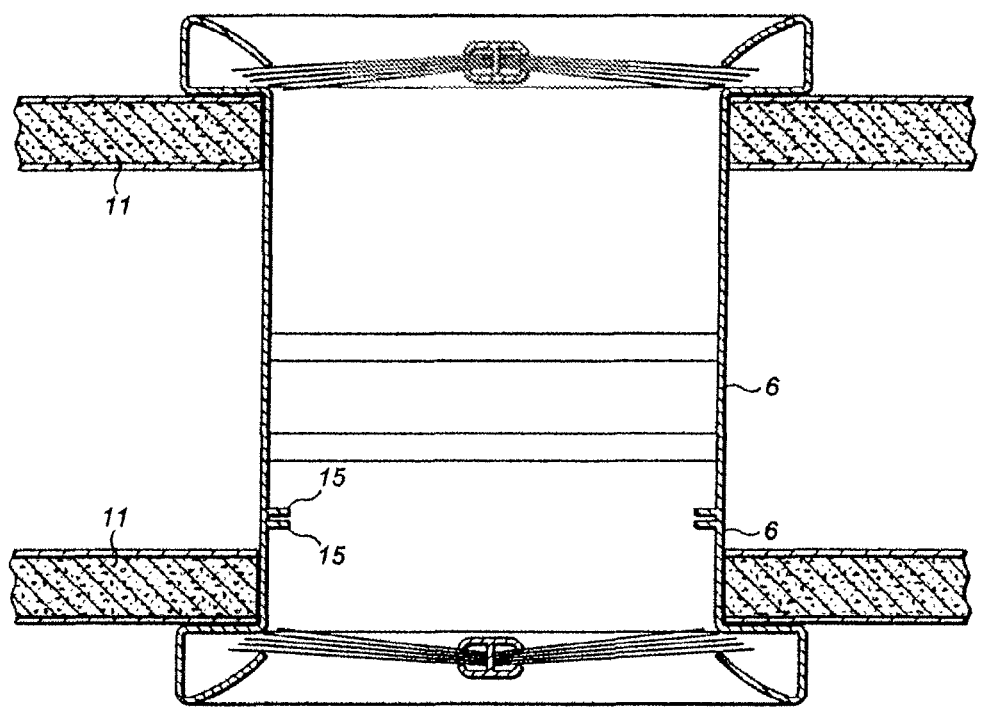
FIG. 7 shows a cross-section of an exemplary arrangement comprising two grommet closures according to the third example of the present invention mated together to provide a channel between two raised floor or wall structures.

FIG. 7 shows two devices according to the third example fitted to parallel floors 11 and arranged such that the lower portions 6 of each side member mate in the space beneath the floors 11, thereby creating a through-hole between the two raised floors 11. The lengths of the lower portions 6 of the side members 3 can be configured as required and the lower portions 6 can further be provided with lip portions 15, if required, to provide a better seal between the two abutting grommet closure devices.

Similarly, two such grommet closure devices could be adapted to pass through walls, a bulkhead, or similar.

Figure 8:
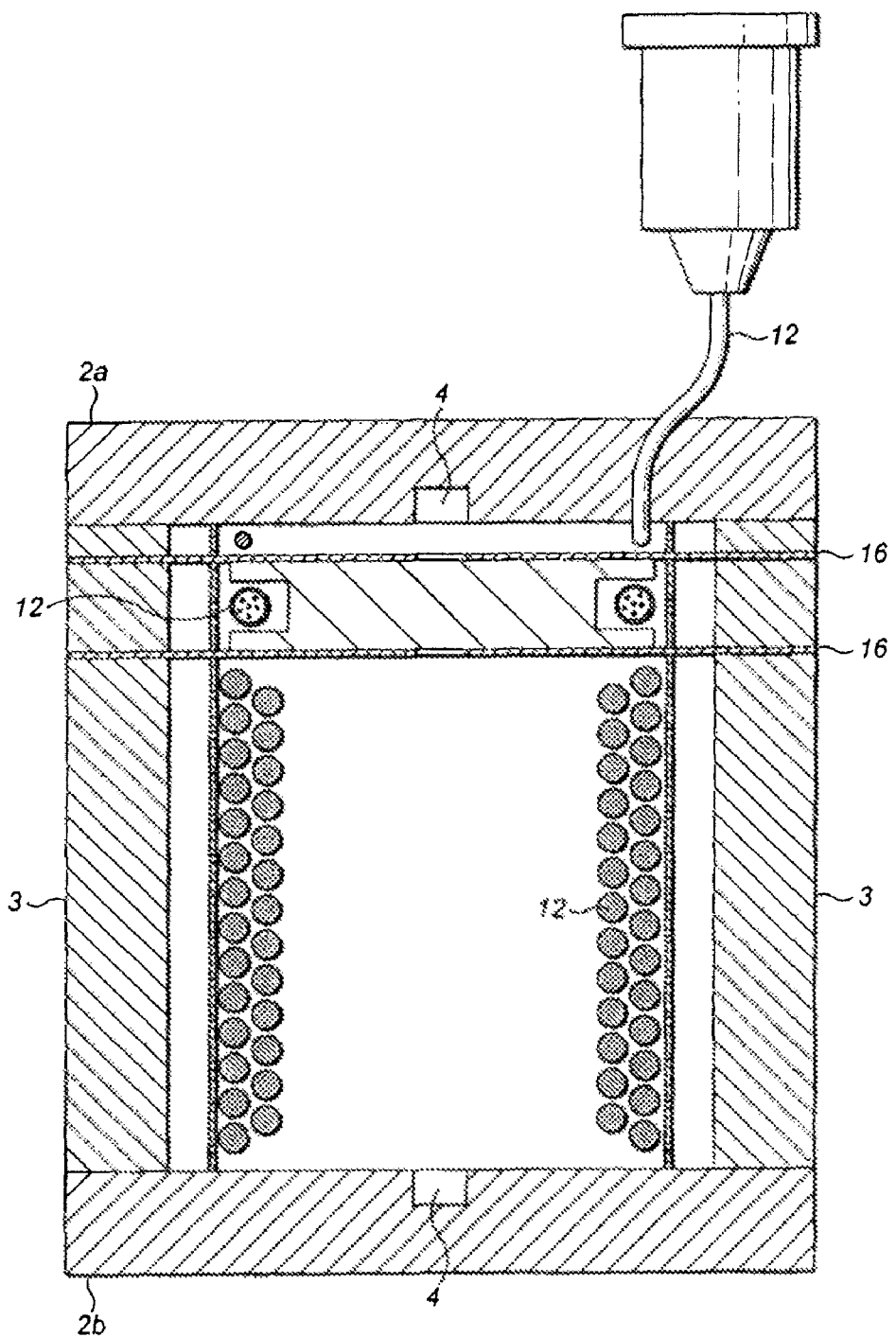
FIG. 8 shows a plan view of a grommet closure according to the present invention with different types of cabling separated by partition plates fitted.

FIG. 8 shows a plan view of a grommet closure device according to the present invention having removable partitions 16 that can be installed to allow different types of cabling 12, such as data cabling and power cabling to be separated as it passes through the grommet closure device.

Figure 9:
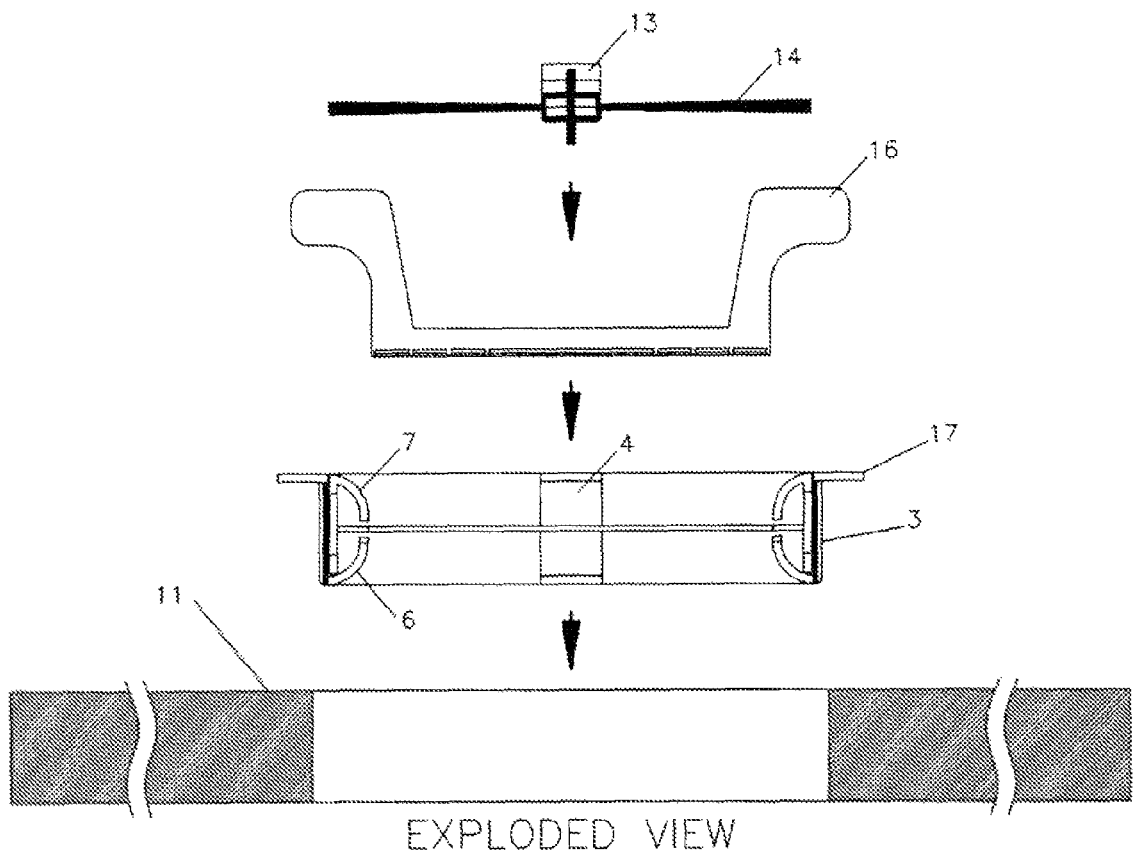
FIG. 9 shows an exploded view of a grommet closure device according to the present invention being inserted into a cable opening in a raised floor.
Figure 9:
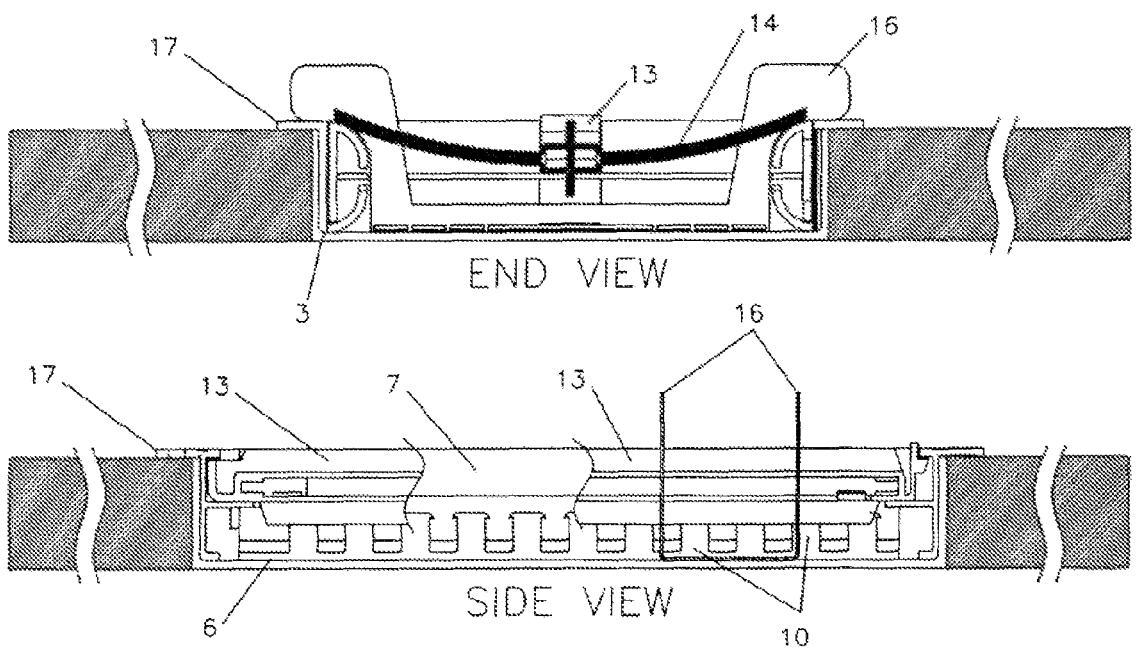

FIG. 9 shows an exploded view of a further example of the present invention, which is very similar to the first example shown in FIG. 1a and 1b, with the exception that an outer flange 17 extends out from the upper portion 7 of the side member 3 and it is this external flange 17 that is arranged to rest on the surface of the raised floor 11 adjacent to the cable opening to support the weight of the grommet closure device when it is inserted into a cable opening.

As can be seen, the partition 16, sealing member 13 and sealing means 14 can all be attached to the frame 1 after it has been fitted to a cable opening.

Figure 10:
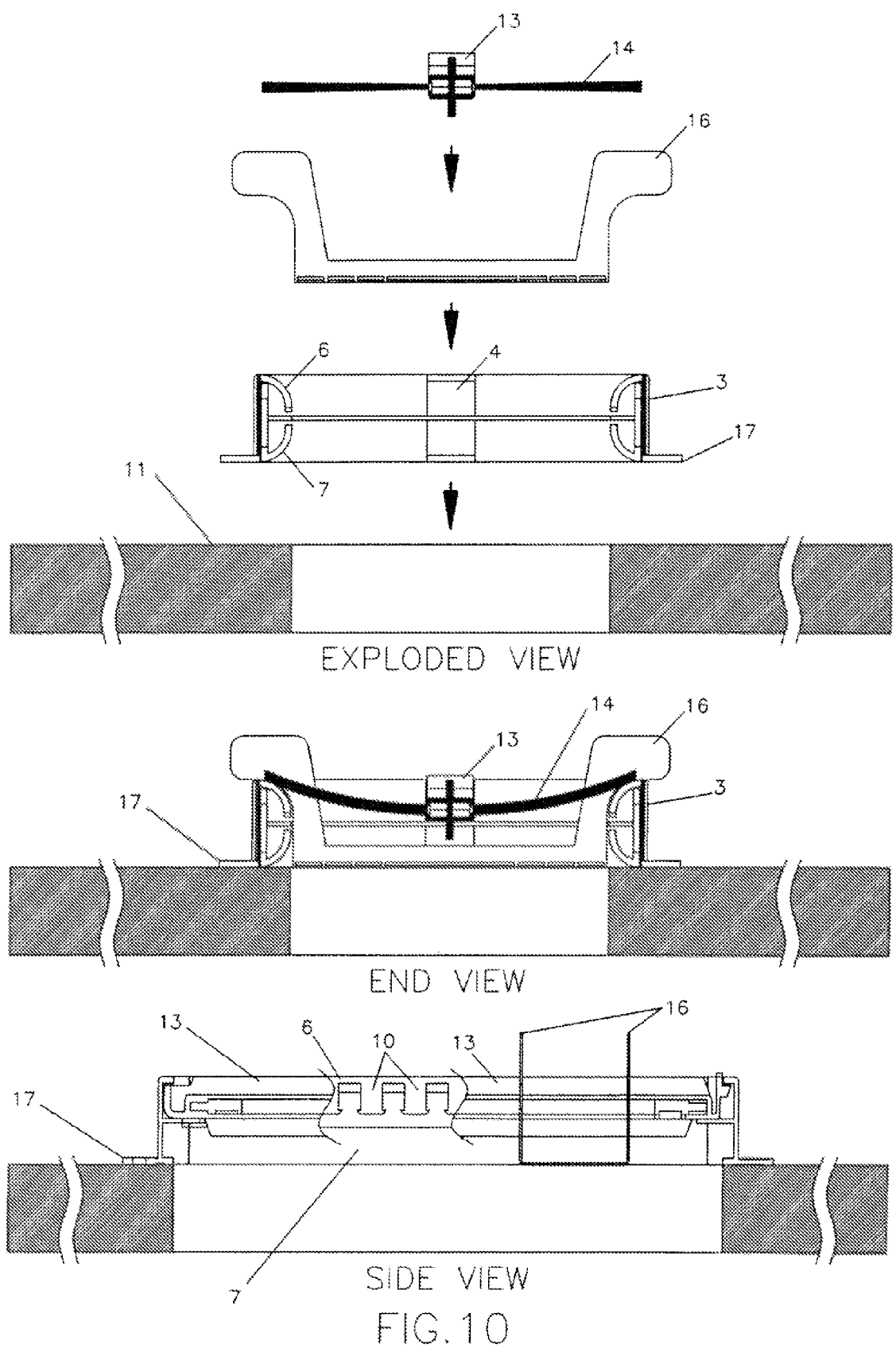
FIG. 10 shows an exploded view of a grommet closure device according to the present invention being placed over a cable opening in an inverted orientation.

An alternative configuration of the grommet closure device shown in FIG. 9 can be seen in FIG. 10, wherein the grommet closure device is used in an inverted surface-mounted orientation such that the outer flange 17 now acts as a base which rests on the surface of the raised floor 11 to support the weight of the grommet closure device above a cable opening. As before, the partition 16, sealing member 13 and sealing means 14 can be attached to the frame 1 after it is in position over a cable opening. Beneficially, in this "inverted" configuration, the grommet closure device can be used with cable openings having an irregular size and shape which are roughly rough cut to allow cabling 12 to pass through the raised floor 11 while still providing the same sealing effect.

The inverted configuration avoids the need to re-size the cable opening, which might otherwise be dangerous due to the proximity of data and power cabling 12 passing through it. Whilst the frame structure 1 of the grommet closure device in the inverted configuration will not necessarily be a pre-defined distance from the edges of the cable opening, it is nonetheless still suitably positioned to restrict the flow of air through the cable opening in an identical manner to the "in-hole" orientation shown in FIG. 9.

As can be seen, the grommet closure device is configured such that the removable partitions 16 for separating different cabling 12 will fit into the frame 1 in both the "in-hole" or "inverted" configurations and cabling 12 can be secured to the anchor points 10 provided on the side members 3 in either configuration.

Similar to the exemplary grommet closure device of FIG. 1b, the side members 3 of the grommet closure device shown in FIGS. 9 and 10 may also be castellated on both the lower portion 6 and upper portion 7, preferably with staggered pitch to prevent cabling 12 of small diameter from slipping into the slots. As before, the curved inner surfaces of the side members 3 provide a continuous curved surface to guide the cabling 12 along a gentle curve, avoiding sharp bends.

Advantageously, the present invention provides a grommet closure device which can ensure a good seal across the entire aperture and hence cable opening. This seal can be maintained the duration that the grommet closure device is fitted due to any cabling 12 being securable to the side members 3 using the anchor points 10 such that cabling 12 will only pass through, and hence distort, the free ends of the sealing means 14 that are not attached to the sealing member 13. Hence cabling 12 will not cause any permanent distortion or pathways between the elements of the sealing means 14 as it might if it were to pass through the sealing means 14 adjacent to their roots where they are attached to the sealing member 13.

Although preferably brush fibres, the sealing means 14 may comprise flexible foam or rubber elements, extruded plastic elements or the like, which all provide the advantage that they will deform only at the position that cabling 12 passes through them, typically at their tips, thereby providing a good sealing effect over the cable opening to restrict the flow of air through it.

The anchor points 10 should be sufficiently robust to be able to take the strain of large volumes of heavy cabling 12 passing through the grommet closure device. This will substantially eases the otherwise difficult challenge of man-handling heavy cable bunches within a rack or cabinets because, once secured to the frame 1 via the anchor points 10, the grommet closure device takes up much of the weight of the heavy cabling 12, allowing it to be more easily manoeuvred or handled.

Also, because the free ends of the sealing means 14 can be retained and supported by the side members 3 either by resting on an upper surface of the side member 3 or by being retained in the gap 8, the sealing means 14 are prevented from sagging or falling down into the cable opening, thereby ensuring that a good seal is maintained across the entire aperture and hence cable opening.

A further advantage of the lower portion 6 of the side members 3 being arranged in a U-shaped configuration is that the under-edge of the raised access floor 11 adjacent to the cable opening into which the grommet closure device is fitted can often have sharp under-edges. The curved lower portion 6 therefore acts to keep cabling 12 away from the potentially damaging effect of the sharp under-edge. This prevents damage to the cabling 12, especially during the installation of cabling 12 where it may be pulled roughly through the cable opening, which can potentially be very dangerous if the cabling 12 is damaged.

Enabling the sealing member 13 to be attached after the frame 1 is fitted provides good visibility and access to the cabling 12 when pulling it through the cable opening and securing it to the anchors 10. Furthermore, the sealing member 13 can be temporarily removed for any later instance of re-entry into the grommet closure device.

The grommet closure device preferably has a metal or plastic frame 1 and can be of any suitable size or configuration to fit within a raised floor 11, depending on the size and configuration of the cable opening. Alternatively, a grommet closure device according to the present invention can be inverted and fitted over a cable opening that is not of a regular size or shape to allow the frame 1 to be fitted into it.

The grommet closure device can similarly be adapted to provide a seal in or over a cable opening in a wall, partition or similar.

The invention claimed is:

1. A grommet closure device for sealing a cable opening in a raised floor, the device comprising:
   a frame structure defining an aperture and including two opposing sides; and
   a sealing member having flexible sealing means attached on two opposing sides thereof, the sealing means on a first side of the sealing member and the sealing means on the opposite side of the sealing member extending along the length of the sealing member, in cantilever fashion, towards different ones of the opposing sides of the frame structure,
   the sealing member being arranged to span the aperture at a central position of the aperture such that unattached ends of the sealing means can extend away from the sealing member and rest on the frame structure, thereby covering the aperture.

2. The device of claim 1, wherein the frame structure is formed of two end members and two side members, at least one of which is detachable.

3. The device of claim 2, wherein an inner surface of at least one side member of the frame structure has a curved portion for cabling to run along.

4. The device of claim 3, wherein the bend radius of the curved portion is greater than the critical bend radius limits of the cabling passing through it.

5. The device of claim 2, wherein the inner surface of at least one side member of the frame structure is provided with a gap along its length for receiving and supporting the unattached ends of the sealing means.

6. The device of claim 1, wherein the sealing member is removably attached to the frame structure.

7. The device of claim 1, wherein the sealing means is removably attached to the sealing member.

8. The device of claim 1, wherein the sealing means are comprised of thin, flexible elements.

9. The device of claim 1, wherein the frame structure is partitioned to separate different cabling.

10. The device of claim 1, wherein the frame structure further comprises an outer flange for supporting the frame structure when fitted inside or over a cable opening.

11. A grommet closure device for sealing a cable opening in a raised floor, the device comprising:
    a frame structure defining an aperture, the frame structure formed of two end members and two side members, at least one of which is detachable; and
    a sealing member having flexible sealing means attached on either side along its length in cantilever fashion,
    the sealing member being arranged to span the aperture such that unattached ends of the sealing means can extend away from the sealing member and rest on the frame structure, thereby covering the aperture, wherein an aperture side of at least one of the side members of the frame structure comprises a plurality of anchor points for securing cabling to.

12. The device of claim 11, wherein the at least one side member comprises a substantially U-shaped portion, in cross-section, along which the plurality of anchor points are provided.

13. The device of claim 11, wherein an inner surface of at least one side member of the frame structure has a curved portion for cabling to run along, and the plurality of anchor points are provided along the curved portion of the at least one side member.

14. The device of claim 11, wherein at least part of the at least one side member is castellated to provide the anchor points.

15. A method of sealing a cable opening in a raised floor, the method comprising fitting the frame structure of a grommet closure device according to claim 1 into or over a cable opening before attaching the sealing member having sealing means to the frame such that the sealing member spans the aperture and the sealing means extend out from the sealing member towards the sides of the frame structure.

* * * * *